Patented July 7, 1931

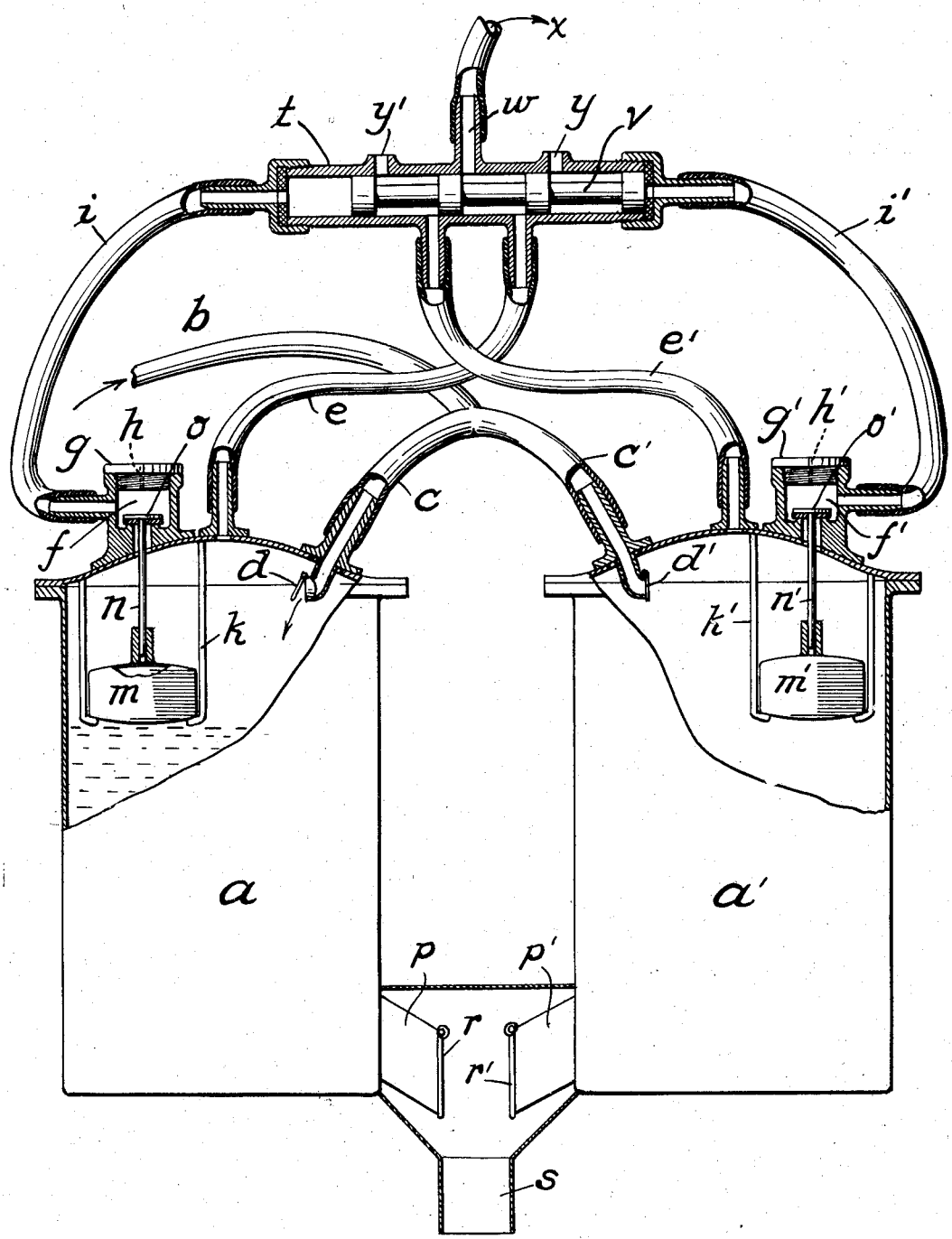

1,813,238

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

CONTINUOUS MILK DELIVERY SYSTEM

Application filed December 18, 1929. Serial No. 415,098.

The ordinary type of "spitting" releaser comprises a receiving chamber and a releasing chamber. The releasing chamber is at regular intervals subjected to high and low pressure (e. g., connected alternately with air and vacuum) to permit, alternately, admission of milk to, and discharge of milk from, the releasing chamber. This frequent intermittent air exhaustion involves great expenditure of power. Moreover, if the pulsations are unequal, the capacity of the releaser is cut down, and the milk in the releaser gradually accumulates, causing flooding. Further, the intermittent discharge of small quantities of milk causes aeration of milk with production of foam.

The object of the present invention is the avoidance of the objections inherent in the ordinary releaser. Specifically, my objects are: avoidance of alternate air admission and exhaust except at relatively very long intervals, the length of an interval being in inverse proportion to the volume of milk entering the releaser; reduction to a minimum of the power required for operation; avoidance of aeration and foaming; and prevention of flooding. These objects are attained in the preferred construction shown in the accompanying drawing, which is one of many possible embodiments of the invention; the figure being an elevation, mainly in section.

Instead of using a single releaser tank, I use two tanks or cans $a$, $a'$, which are or may be identical in construction and have similar connections with the milk supply and the pressure control valve.

The milk from the teat cups of any milking machine (not shown) flows through a pipe $b$ and thence through either branch pipe $c$ or $c'$, to the corresponding tank $a$ or $a'$. On the discharge end of each branch pipe is a valve ($d$ or $d'$) which opens when the corresponding tank is under suction (partial vacuum) and closes when the corresponding tank is under atmospheric or other relatively high absolute pressure.

From the heads of the respective tanks extend air tubes $e$ and $e'$ to nozzles on a valve casing $t$.

Mounted on the heads of the respective tanks are castings forming small air chambers $f$, $f'$. Each casting has a passage connecting the air chamber with the interior of the corresponding tank. The chambers are closed at the top by caps $g$, $g'$, which are provided with constricted air passages $h$, $h'$, communicating with the atmosphere.

The two air chambers $f$, $f'$, have nozzles which connect, by means of tubes $i$, $i'$, respectively, with nozzles on the opposite ends of the valve casing $t$.

Depending from the heads of the respective tanks are hangers $k$, $k'$, supporting floats $m$, $m'$, which slidably engage valve stems $n$, $n'$, extending into the air chambers $f$, $f'$. The valve stems carry valve heads $o$, $o'$, preferably of very light construction, adapted, when seated, to close air communication between air chambers $f$, $f'$, and the interiors of the respective tanks.

The lower ends of the respective tanks, if the tanks are used as releasers, are provided with discharge nozzles $p$, $p'$, equipped with valves $r$, $r'$, which, as in ordinary releasers, close when the tanks are under vacuum and open, under pressure of the milk, when the vacuum is released. The milk from both tanks may discharge into a common funnel $s$ connected with any milk receiver.

In the valve casing $t$ is a reciprocable valve $v$. The valve casing has a centrally located nozzle $w$ communicating with a vacuum pipe $x$ and two atmospheric ports $y$ and $y'$ between the vacuum port and opposite ends of the valve casing.

When valve $v$ is in the position shown, tank $a$ is in communication, through tube $e$, with vacuum port $w$, the interior of the tank is under vacuum, valve $d$ is open, and valve $r$ is closed. Float $m$ rests by gravity on its hanger. Valve $o$ rests on its seat by gravity and is also held thereon by the superior or atmospheric pressure in pipe $i$. Milk consequently enters the tank through pipe $c$ and accumulates therein.

While tank $a$ is filling with milk, tank $a'$ is in communication, through tube $e'$ and port $y'$, with the atmosphere. Valve $d'$ is therefore closed and no milk enters the tank. If there is any milk in the tank, valve $r'$ opens and the milk discharges into the funnel s. Tube i' is under atmospheric pressure, so that valve o' closes by its own weight.

The above described condition continues until the milk accumulating in tank a lifts float m and opens valve o. The operation whereby this opening of the valve is effected is as follows: Milk rises in tank a until float m is immersed to such depth that it floats. Continued rise of milk raises the float until it contacts with the lower end of valve stem n. At that point the float m stops, since, before it can open valve o, it has a substantial load to overcome, namely, its own weight plus the weight of the valve plus the difference in pressure between chamber f and tank a tending to keep the valve shut. The milk continues to rise until the float is immersed to such point that its lifting power is more than the weight of the float plus the weight of the valve plus the difference in pressure tending to keep the valve closed. The valve then opens and the pressure on the top and bottom of the valve is equalized. The only necessary lifting power of the float is then the weight of the float plus the weight of the valve. The float then rises, carrying the valve with it. Thus is obtained a quick and full opening of valve o. This quick opening of valve o gives a full vacuum in tube i and the left-hand chamber of cylinder t. This tends to move the piston valve v in cylinder t to the left. If no air was supplied to the tube i'' and the right-hand chamber of the cylinder, valve v would move to a little past the central point and then stop, as the pressure would be equalized on both sides of the piston. Thus the valve would get on dead centre and become inoperative. However, the movement of valve v a short distance to the left effects some rarefication of the air in the right-hand chamber of cylinder t, in tube l'' and in chamber f', with a resultant unbalancing of pressure on opposite sides of valve o'. This valve being made of as light a weight as is practicable and being movable independently of the float, a slight difference in pressure, that is, a reduction in pressure in chamber f' to but slightly below atmospheric pressure, will cause valve o' to lift and allow air to flow from tank a' (which at this time is under atmospheric pressure) into chamber f' and tube i'' and the right-hand chamber of cylinder t, thus maintaining a superior (practically atmospheric) pressure on the right-hand end of valve v until it has completed its stroke to the left.

Thereby the air pressure conditions in the two tanks are reversed. Tank a is connected with atmosphere through tube e and port y. Valve d closes, shutting off inflow of milk. Valve r opens under pressure of the body of milk and discharges the milk into funnel s. On the other hand, tank a' is connected with vacuum through tube e' and port w. Valve d' opens and milk flows into the tank. Valve r' closes. Milk therefore accumulates in the tank. This condition continues until the milk level rises to the height required to operate float m' and valve o'.

In describing the unbalancing of pressure on opposite sides of piston valve v the effect of leakage of air through restricted ports h and h' has been ignored. In fact, these ports are not large enough to admit air with sufficient rapidity to materially affect the described shifting of piston valve v from one end to the other of cylinder t. If these ports were of substantial diameters, they would reduce the vacuum on the pulling end of valve v to such an extent as to make assured operation impossible. The only function performed by these ports is to allow slow inflow of air to overcome possible leaks of the valves and to establish and maintain atmospheric pressure at both ends of valve v during the time that a tank is filling with milk, thus insuring against any tendency of valve v to shift away from its end position until it is shifted by reason of the unbalanced pressure produced by the operation of the valves o and o' as hereinbefore described.

Instead of using tanks a and a' as releasers, they may be used as ultimate containers, that is, as ordinary milk cans. In such case they would be, of course, unprovided with the described valved outlets at the bottom; and upon one can being filled, it would be replaced by another can. If the can should not be replaced, then, after the other can is filled, valve v will move into a neutral position and the operation will cease.

Having now fully described my invention, what I claim and desire to protect by Letters Patent is:

1. A continuous milk delivery system comprising a pair of tanks, a milk inlet to both tanks, a source of suction, a pressure operated valve operable, in different positions, to connect first one tank and then the other with a source of suction, and means operable, when the milk flowing into the tank under suction reaches a predetermined level, to so unbalance the pressure on said value as to effect its movement to connect the other tank with said source of suction.

2. A continuous milk delivery system comprising a pair of tanks, a milk inlet to both tanks, air passages, a pressure operated valve adapted to control said air passages and thereby simultaneously subject either tank to a relatively high pressure and the other to a relatively low pressure, and means operable, when the milk flowing into the tank under low pressure reaches a predetermined level, to so unbalance the pressure on said valve as to effect its movement to reverse said tank pressures.

3. A continuous milk delivery system comprising a pair of tanks, a milk inlet to both tanks, air pipes one opening into each tank, a source of suction, a pressure operated control valve adapted in one position to connect one air pipe, and disconnect the other air pipe, with suction and adapted in another position to reverse said connections, a float in each tank, a valve operable by each float, and an air pipe adapted, when the last named valve is operated by the float, to open an operable face of the control valve to suction to thereby shift the valve to reverse the suction connections to the first named air pipes.

4. A continuous milk delivery system comprising a pair of tanks, a milk inlet to both tanks, air pipes one opening into each tank, a source of suction, a main pressure operated control valve adapted in one position to connect one air pipe with suction and the other air pipe with a source of higher pressure and adapted in another position to reverse said connections, air passages connected respectively with the tanks and with opposing pressure faces of the main valve, a float in each tank, valves betwen the tanks and the respective air passages, the last named valves being operable independently of the floats by unbalanced pneumatic pressure and being operable also by the corresponding floats when they accumulate sufficient energy to overcome said unbalanced pressure.

5. A continuous milk delivery system comprising a pair of tanks, a milk inlet to both tanks, a valve casing having suction and pressure ports, air pipes connecting the respective tanks with the valve casing, a pressure operated control valve in the valve casing adapted in one position to connect one air pipe with a suction port and the other air pipe with a pressure port and adapted in another position to reverse said connections, a float in each tank, a valve operable by each float, and an air pipe adapted, when the last named valve is operated by the float, to open an operable face of the control valve to the suction in the corresponding tank and thereby effect a shifting of the control valve from one of said positions to the other.

6. A continuous milk delivery system comprising a pair of tanks, a milk inlet to both tanks, air pipes one opening into each tank, a source of suction, a pressure operated control valve adapted in one position to connect one air pipe, and disconnect the other air pipe, with suction and adapted in another position to reverse said connections, air chambers one above each tank, there being an air passage from each air chamber to the corresponding tank, a valve adapted to close said passage, an air pipe connecting each air chamber with an operable face of the valve, and a float in each tank adapted, when the milk in the tank reaches a predetermined level, to open the last named valve and, by thus connecting said operable face of the control valve with suction, effect its shift from one of said positions to the other.

7. A continuous milk delivery system comprising a pair of tanks, a milk inlet to both tanks, air pipes one opening into each tank, a source of suction, a main pressure operated control valve adapted in one position to connect one air pipe with suction and the other air pipe with a source of higher pressure, and adapted in another position to reverse said connections, air passages connected respectively with the tanks and with opposing pressure faces of the main valve, a float in each tank, valves between the tanks and the respective air passages, the last named valves being operable independently of the floats by unbalanced pneumatic pressure and being operable also by the corresponding floats when they accumulate sufficient energy to overcome said unbalanced pressure, and means providing a permanently open restricted passage through which air can flow slowly into said air passages.

8. A continuous milk delivery system comprising a pair of tanks, a milk inlet to both tanks, air pipes one opening into each tank, a source of suction, a main pressure operated control valve adapted in one position to connect one air pipe with suction and the other air pipe with a source of higher pressure, and adapted in another position to reverse said connections, air passages connected with opposing pressure faces of the main valve and with the respective tanks, valves between the tanks and the respective air passages and operable by unbalanced pneumatic pressure whereby when one tank is under suction the corresponding valve is held closed, a float in each tank movable independently of the corresponding valve but adapted, when lifted to a predetermined level by accumulating milk in a tank, to lift the corresponding valve and connect the corresponding air passage with suction and thereby effect movement of the valve from one operative position toward the other, the valve controlling the other air passage being opened by unbalanced pressure to maintain air pressure in the corresponding air passage to insure the completion of the shift of the main valve.

9. The construction specified in claim 8 in which the air chamber is provided with a permanently open restricted passage allowing a relatively slow flow of air thereinto.

10. A continuous milk delivery system comprising a pair of tanks, a milk inlet to both tanks, air passages, a pressure operated valve adapted to control said air passages and thereby simultaneously subject either tank to a relatively high pressure and the other to a relatively low pressure, and means operable, when the milk flowing into the tank under low pressure reaches a predetermined level, to unbalance the pressure on said valve and maintain said pressure unbalanced until the valve completes the shift required to reverse and maintain reversed said tank pressure.

In testimony of which invention, I have hereunto set my hand, at New York City, New York, on this 18th day of November, 1929.

CYRUS HOWARD HAPGOOD.